United States Patent [19]

Bigelow et al.

[11] 3,898,434

[45] Aug. 5, 1975

[54] MACHINE READABLE CODED MEMBER

[75] Inventors: Arthur G. Bigelow, Dublin; Wilbur W. Bigelow, Pleasanton; Gale E. Stone, Sunnyvale, all of Calif.

[73] Assignee: Control Point, Inc., Dublin, Calif.

[22] Filed: Feb. 11, 1974

[21] Appl. No.: 441,643

[52] U.S. Cl. .......... 235/61.12 N

[51] Int. Cl.[2] .......... G06K 19/06

[58] Field of Search .......... 235/61.12 N, 61.12 R; 340/146.3 K

[56] References Cited

UNITED STATES PATENTS

| | | | |
|---|---|---|---|
| 2,337,553 | 12/1943 | Hofgard | 235/61.12 N |
| 3,532,859 | 10/1970 | La Plume | 340/146.3 K |

*Primary Examiner*—Daryl W. Cook

*Attorney, Agent, or Firm*—Jack M. Wiseman

[57] ABSTRACT

A machine readable coded member is formed of pattern areas, each pattern area corresponding to a character. Each pattern area is rectangular and is divided equally into pattern portions. The presence or absence of indicia in selected pattern portions within each pattern area represents a designated character. Each pattern portion within a pattern area is bounded on at least two sides thereof by two adjacent pattern portions. An index mark or portion is provided for each pattern area. The coded member is of the type which is moveable with respect to a scanner to permit the scanner to read the coded member, and at least two of the pattern portions of each pattern area are aligned along a path of travel of the coded member with respect to such a scanner. However, the index mark or portion is not aligned with any of the pattern portions of the corresponding pattern area along the path of travel of the coded member with respect to the scanner.

4 Claims, 13 Drawing Figures

MACHINE READABLE CODED MEMBER

BACKGROUND OF THE INVENTION

1. Field of the Invention

This invention relates generally to a coded member having printed pattern areas arranged to be sensed by scanners, and more particularly to such a coded member in which the presence or absence of indicia in selected pattern portions within a particular pattern area represents a designated character.

2. Prior Art

A number of code formats are available for representing alphabetic and/or numeric information which are sensed by scanners. Many of the machine readable codes are formulated such that a single center is employed for sensing and providing the signal information necessary for recognizing the correct information represented by a particular code. These code formats require a relatively higher degree of accuracy in the registration of the printed coded information or indicia on the document and/or a relatively high degree of accuracy in the registration of the document with respect to the scanner. In addition, many of the well known code formats require a particular reading speed of the document with respect to the scanner or, as a minimum, require a relatively constant reading speed.

One of the most widely known code formats, of which several types are employed, is the bar code in which varying thicknesses of bars are spaced from one another along the path of the travel of the carrier documents with respect to a scanner. In the majority of these code formats, two bar widths are employed; one representing a binary zero and the other representing a binary one. It can be readily appreciated that such a code format requires a relatively constant reading speed, since a relatively narrow bar may appear to be of greater width at a slower than normal reading speed.

Another type of bar code employs bars having varying lengths which are arranged such that the length of each bar can be read by the associated scanner. This type of code format is also subject to errors if the reading speed of the scanner is not maintained within prescribed limits. In addition, this type of code format requires a relatively high degree of accuracy in the registration of the carrier document during its movement with respect to the scanner, particularly with respect to the skewing of the bars.

Another type of code format is known which is capable of producing a particular signature when it is scanned. The most widely known of this type of code format is the MICR code employed on bank checks. Although the numeric characters on bank checks are printed with magnetic ink and sensed magnetically, optical codes and scanners which function in a similar manner are also known. These types of code formats are particularly susceptible to reading errors if the carrier document is not registered with the scanner with an extremely small tolerance.

Another type of numeric code or format is disclosed in an application for U.S. patent, Ser. No. 380,896, filed July 19, 1973, and entitled "Apparatus For And Method Of Auditing Business Records", which is assigned to the assignee of the present application. One of the code formats disclosed in the abovementioned application is readable by persons and by scanners. This code format employs six pattern portions within each pattern area and an index mark associated with each pattern area and positioned for being sensed by a scanner. Each pattern area corresponds to a designated number character. Two pattern portions form a horizontal line of the designated numeral character and are joined by vertical line indicia to render the code format human readable. The above-mentioned application also discloses two other, but similar, code formats which are readable only by scanners. All of the code formats disclosed in the above-mentioned application are readable by a scanner having seven discrete sensing areas; one for each pattern portion of each pattern area and one for the index mark associated with each pattern area.

The scanner disclosed in the above-mentioned application is enabled to recognize the presence or absence of indicia in each pattern portion of a particular pattern area when the presence of indicia is sensed within the sensing area of the scanner corresponding to the location of an index mark associated with that pattern area. The use of an index mark, therefore, permits the positioning of two or more pattern portions in alignment with one another along the path of travel of the carrier documents with respect to the scanner. Although the code formats disclosed in the above-mentioned application do not require the degree of accuracy in the registration of the indicia on the carrier document and in the registration of the carrier document with respect to the scanner, or the relatively small tolerances which are required by other code formats, the need exists for a code format in which the degree of registration and accuracy can be smaller and the permissible tolerances can be greater.

The code formats disclosed in the above-mentioned application are primarily intended for use on business records, such as sales slips and guest checks. An edge of the carrier document is employed as a reference while the document is moving with respect to the scanner and the code imprinted thereon is being sensed. Sales slips and guest checks when manually handled are subject to degradation, which may result in misregistration of the carrier document with respect to the scanner during its travel therethrough. Accordingly, it can be appreciated that a need exists for a code format which does not require a relatively large degree of accuracy in the registration of the pattern area with respect to a reference on the carrier document or in the registration of a reference of the carrier document with respect to a scanner. The registration accuracy is related to both lateral displacement and to skewing.

SUMMARY OF THE INVENTION

Accordingly, it is a primary object of the present invention to provide a coded member in which the indicia of the pattern portions need not be located or positioned with a great degree of accuracy with respect to a reference of a carrier document.

Another object of the present invention is to provide a coded member in which a reference of the carrier document may vary within relatively large tolerance limits while permitting reliable sensing of the pattern portions thereof by a scanner.

Still another object of the present invention is to provide a code member which can be translated with respect to a scanner through a wide range of speeds without degradation of the sensed information.

These and other objects of the present invention are obtained by the provision of a plurality of pattern portions within each pattern area, which pattern area represents a designated character. The pattern portions of the pattern area are rectangular and are each bounded on two sides by two adjacent pattern portions. A feature of the present invention resides in the provision of an index mark which is aligned with the pattern area along a line which is perpendicular to the path of travel of the carrier document with respect to the scanner.

The invention, however, as well as other objects, features and advantages thereof, will be more fully realized and understood from the following detailed description, when taken in conjunction with the accompanying drawings, wherein:

DESCRIPTION OF THE DRAWINGS

Like reference numerals throughout the various views of the drawings are intended to designate the same elements.

DETAIL DESCRIPTION OF THE PREFERRED EMBODIMENT

Figure 1:
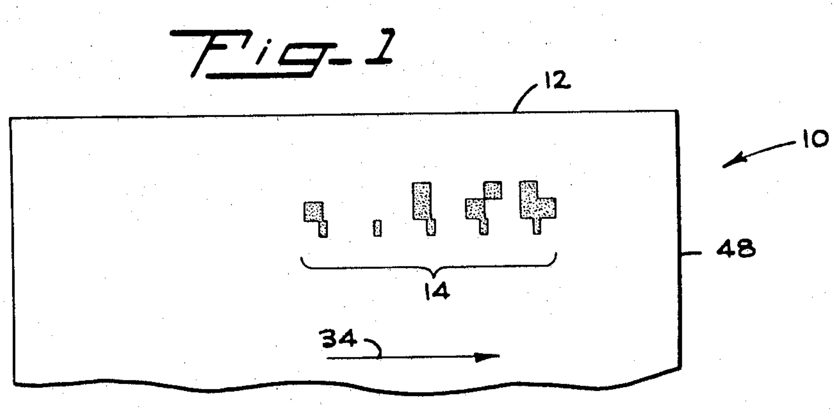
FIG. 1 is a plan view of a coded member having pattern areas thereon, each pattern area corresponding to a designated character.

With reference to FIG. 1, there is shown a coded member, generally designated with the reference numeral 10. The coded member 10 contains coded patterns which are formatted in accordance with the principals of the present invention and includes a carrier document 12 and a plurality of pattern areas generally designated with the reference numeral 14. Each pattern area corresponds to a respective designated character, with five such pattern areas and associated index marks being imprinted on the document 12 in FIG. 1 in the exemplary embodiment.

Figure 2:
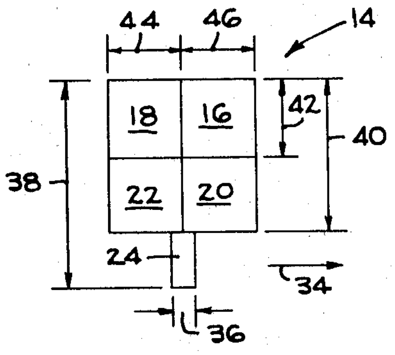
FIG. 2 is a graphical representation of a pattern area corresponding to the coded portions of the coded member illustrated in FIG. 1.

FIG. 2 is a graphical representation of the portions of a pattern area and the index mark portion which are arranged for designating indicia, with the presence or absence of indicia in the pattern portions corresponding to a designated character. More particularly, each pattern area is divided into four quadrants, designated with the reference numerals 16, 18, 20 and 22, with each quadrant forming a pattern portion. An index mark portion 24 is associated with each pattern area 14. The index mark portion 24 is marked with indicia, such that an associated scanner will recognize the presence of a pattern area associated therewith. The presence or absence of indicia in the respective pattern portions 16, 18, 20 and/or 22 represents a designated character. It can be appreciated that 16 different combinations of pattern areas can be formatted.

Figure 4:
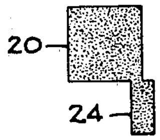
FIGS. 3–12 are pattern areas with pattern portions thereof indicated as containing indicia to represent the numerals zero to nine, respectively.
Figure 3:
Figure 7:
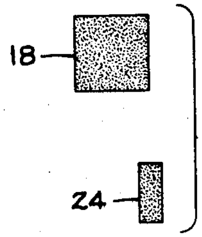
Figure 5:
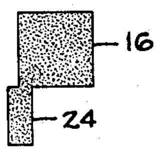
Figure 6:
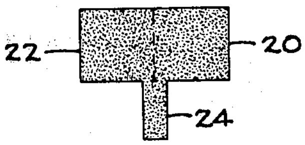
Figure 8:
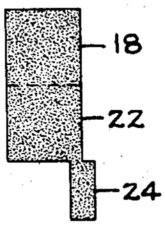
Figure 9:
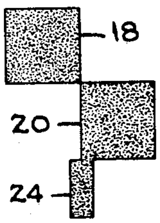
Figure 10:
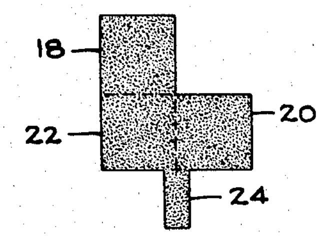
Figure 11:
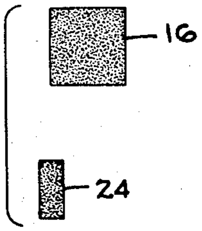
Figure 12:
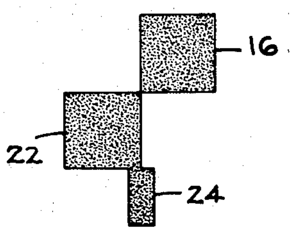

The extent of the 16 possible combinations are illustrated in FIGS. 3–12 and represent numeral characters 0–9, respectively, in the exemplary embodiment. As indicated above, an indicia bearing index mark portion 24 is associated with each pattern area. The pattern area illustrated in FIG. 3 contains no indicia in any of the pattern portions. Accordingly, when an associated scanner senses the index mark 24 and the absence of indicia in all of the pattern portions of the pattern area associated therewith, the numeral 0 is detected. FIG. 4 illustrates a pattern area in which only the pattern portion 20 contains indicia. Accordingly, when an associated scanner senses the presence of indicia in the index mark portion 24 and the presence of indicia only in the pattern portion 20, a numeral 1 will be detected. A similar recognition operation occurs for the pattern areas illustrated in FIGS. 5–12.

The coded format of the present invention can be sensed by any scanner capable of detecting the presence or absence of indicia in the pattern portions 16, 18, 20 and 22 and the presence of indicia in the index mark portion 24. Such a scanner is illustrated diagramatically in FIG. 6 of the above-mentioned pending application, Ser. No. 380,896. Such a scanner employs a plurality of fiber optic bundles, each of which is associated with an aperture in a mask, such as apertures 26 and 28 of a mask 30 illustrated in FIG. 13 of the present application. Fiber optic bundles are available in which approximately one-half of the fibers in a particular bundle are separated from the other half at one end of the bundle, but are equally intermingled with one another at the other end of the bundle. The use of such fiber optic bundles permits the transmission of light from a light source through the fiber optic bundle to an object and the transmission of light reflected from the object through the fiber optic bundle to a senser.

Accordingly, a light source is employed for illuminating one half of the fibers in each of the bundles and the remaining other half of the fibers in each of the bundles extend to a senser. The other end of each of the bundles which the fibers are intermingled with one another is mounted over an appropriate one of the apertures 26 or the aperture 28 to permit the transmission of light in both directions therethrough. The approximate position of that end of a particular bundle around the apertures 26 and 28 is represented by the dotted lines in FIG. 13 designated with the reference numeral 32. Accordingly, light from a light source is transmitted through one-half of the fibers in each of the bundles and through a corresponding one of the apertures 26 or 28 to the surface of the coded member 10. Light which is reflected from the coded member 10 is transmitted back through the apertures 26 or 28 and through the other one-half of the fibers in each of the bundles to the corresponding senser. One senser is provided for each fiber optic bundle and each one of the apertures 26 and 28.

The ink used in printing the indicia in the pattern areas 16, 18, 20 and 22 and in the index mark portion 24 should be of a light absorbing type and the material of the carrier document 12 on which the indicia is imprinted should have good light reflecting characteristics. Such ink is known as OCR ink and such paper is well known in the art.

Figure 13:
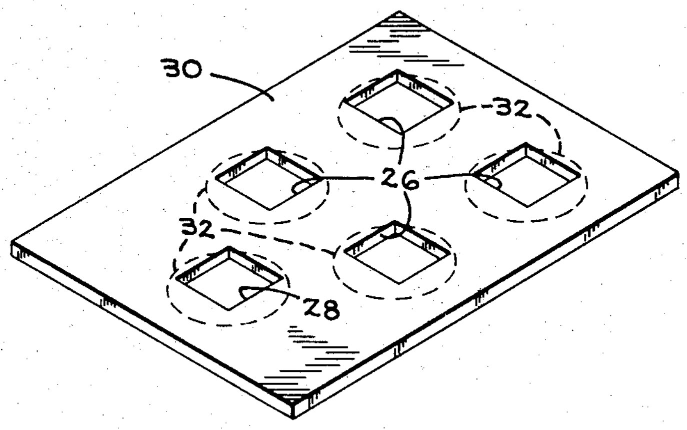
FIG. 13 is a view in perspective of a mask associated with the scanner for reading the coded portions of the coded member illustrated in FIG. 1.

The coded member 10 illustrated in FIG. 1 is disposed for passing through a scanner and under the mask 30 illustrated in FIG. 13 along a path of travel indicated by an arrow which is designated with the reference numeral 34 in FIGS. 1 and 2. As shown more clearly in FIG. 2, each of the pattern portions 16, 18, 20 and 22 are bounded on two sides thereof to adjacent pattern portions and the index mark portion 24 is aligned with each pattern area along a line which is perpendicular to the path of travel of the coded member 10 with respect to an associated scanner. Accordingly, each of the apertures 26 is disposed for alignment with one of the pattern portions 16, 18, 20 and 22 when the aperture 28 is aligned with the index mark portion 24. The outputs of the sensers associated with the apertures 26 and 28 can be decoded by appropriate logic circuits which are well known in the art, such as is disclosed in the above-mentioned pending application. Although four pattern portions have been shown and disclosed herein for each pattern area, it can be appreciated that additional pattern portions can be divided in each pattern area. For example, six pattern portions in each pattern area will provide 64 different combinations corresponding to 64 assembles being represented.

In one embodiment of the present invention, the index mark portion 24 was located, as shown in FIG. 2, with its mid point on the line dividing the pattern portions 20 and 22. The width of the pattern portions 24, indicated with the reference numeral 36, was 0.03 inch, the dimension 38 was 0.274 inch, the dimension 40 was 0.2 inch, the dimension 42 was 0.1 inch, and the dimensions 44 and 46 were 0.095 inch. As shown in FIG. 1, the top edge of the pattern areas 14 were located 0.25 inch from the edge 12 and the right hand edge of the first pattern area was located 0.25 inch from an edge 48. It can be appreciated that these dimensions can be altered to suit the requirements of the user.

We claim:

1. A coded member comprising:

a. a pattern area representing a designated character, b. said pattern area being formed of a plurality of pattern portions, c. each of said pattern portions being formed with the presence or absence of indicia adopted to be sensed by a scanner, the presence or absence of indicia in predetermined areas of said pattern portions of said pattern areas represents the designated character for said pattern area, d. each of said pattern portions having a rectangular configuration and being bounded on two sides thereof by adjacent pattern portions of said plurality of pattern portions; and e. an index portion adjacent to said pattern area, said index portion being formed with indicia to be sensed by the scanner.

2. A coded member as claimed in claim 1, wherein said index portion is positioned outside a line which circumscribes all of said pattern portions of said pattern area.

3. A coded member as claimed in claim 2, wherein said index portion being positioned adjacent to and extending from the intersection of two adjacent pattern portions of said pattern area.

4. A coded member as claimed in claim 2, wherein said index portion being disposed at right angles to the path of travel of the coded member with respect to the scanner.

* * * * *